US010232745B2

(12) United States Patent
Ferre

(10) Patent No.: US 10,232,745 B2
(45) Date of Patent: Mar. 19, 2019

(54) ACTUATING MODULE FOR A VEHICLE SEAT

(71) Applicant: Faurecia Automotive Seating, LLC, Auburn Hills, MI (US)

(72) Inventor: Ludovic Ferre, Flers (FR)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 0 days.

(21) Appl. No.: 15/901,926

(22) Filed: Feb. 22, 2018

(65) Prior Publication Data

US 2018/0244177 A1 Aug. 30, 2018

Related U.S. Application Data

(60) Provisional application No. 62/463,969, filed on Feb. 27, 2017.

(51) Int. Cl.
| | |
|---|---|
| *B60N 2/06* | (2006.01) |
| *B60N 2/22* | (2006.01) |
| *B60N 2/23* | (2006.01) |
| *F16H 19/08* | (2006.01) |

(52) U.S. Cl.
CPC .......... *B60N 2/2213* (2013.01); *F16H 19/08* (2013.01); *F16H 2019/085* (2013.01)

(58) Field of Classification Search
CPC .. B60N 2/2213; F16H 19/08; F16H 2019/085
USPC ........... 297/362.11, 378.12, 378.14, 344.17, 297/344.2
See application file for complete search history.

(56) References Cited

U.S. PATENT DOCUMENTS

| | | | | |
|---|---|---|---|---|
| 4,470,632 A | * | 9/1984 | Babbs ................. | B60N 2/0232 297/330 |
| 4,962,963 A | * | 10/1990 | Robinson ............. | B60N 2/0232 297/362.11 X |
| 4,966,045 A | * | 10/1990 | Harney ................ | B60N 2/0224 297/344.17 X |
| 5,199,764 A | * | 4/1993 | Robinson ............. | B60N 2/0232 297/362.11 |
| 5,292,178 A | * | 3/1994 | Loose .................. | B60N 2/0232 297/362.11 X |
| 5,483,853 A | * | 1/1996 | Moradell ............. | B60N 2/0228 297/362.11 X |
| 6,322,146 B1 | * | 11/2001 | Fisher, Jr. ............ | B60N 2/0232 297/362.11 |
| 6,540,295 B1 | * | 4/2003 | Saberan ................ | B60N 2/206 297/362.11 X |
| 6,893,092 B1 | * | 5/2005 | Krambeck ........... | B60N 2/0232 297/362.11 |
| 7,152,922 B2 | * | 12/2006 | Garland ............. | B60N 2/01583 297/362.11 |
| 7,500,719 B2 | * | 3/2009 | Kojima ................ | B60N 2/0232 297/362.11 X |

(Continued)

FOREIGN PATENT DOCUMENTS

EP 2835280 A1 2/2015

*Primary Examiner* — Rodney B White
(74) *Attorney, Agent, or Firm* — Barnes & Thornburg LLP

(57) ABSTRACT

A module for a vehicle seat comprises a drive cable, an actuator, and a transmission assembly. The actuator is coupled to the transmission assembly to drive the transmission assembly. The drive cable is coupled to the transmission assembly and moves as a result of the actuator being activated.

20 Claims, 4 Drawing Sheets

(56) References Cited

U.S. PATENT DOCUMENTS

| | | | | |
|---|---|---|---|---|
| 7,661,760 B2* | 2/2010 | Nakaya | ........... | B60N 2/0232 |
| | | | | 297/362.11 X |
| 7,976,103 B2* | 7/2011 | Gamache | ........... | B60N 2/0232 |
| | | | | 297/362.11 X |
| 8,056,981 B2* | 11/2011 | Kojima | ........... | B60N 2/0232 |
| | | | | 297/362.11 |
| 8,146,991 B2* | 4/2012 | Stanz | ........... | B60N 2/0232 |
| | | | | 297/344.17 X |
| 8,313,145 B2* | 11/2012 | Flesch | ........... | B60N 2/0232 |
| | | | | 297/362.11 |
| 8,400,033 B2 | 3/2013 | Karaki | | |
| 8,443,690 B2* | 5/2013 | Koga | ........... | B60N 2/0232 |
| | | | | 297/362.11 X |
| 8,534,147 B2* | 9/2013 | Roither | ........... | A47C 20/041 |
| | | | | 74/89.33 |
| 9,010,860 B2 | 4/2015 | Kume | | |
| 2003/0080601 A1* | 5/2003 | Charras | ........... | B60N 2/206 |
| | | | | 297/378.12 |
| 2005/0104433 A1* | 5/2005 | Ganot | ........... | B60N 2/08 |
| | | | | 297/378.12 |
| 2006/0272444 A1 | 12/2006 | Cockerham | | |
| 2007/0013218 A1 | 1/2007 | Kayumi | | |
| 2008/0012411 A1 | 1/2008 | Kennedy | | |
| 2010/0259120 A1 | 10/2010 | Karaki | | |
| 2016/0016493 A1* | 1/2016 | Deppe | ........... | B60N 2/0232 |
| | | | | 297/378.12 X |
| 2018/0099583 A1* | 4/2018 | Yagi | ........... | B60N 2/0232 |
| 2018/0111510 A1* | 4/2018 | Takada | ........... | F16H 35/18 |

* cited by examiner

ACTUATING MODULE FOR A VEHICLE SEAT

PRIORITY CLAIM

This application claims priority under 35 U.S.C. § 119(e) to U.S. Provisional Application No. 62/463,969, filed Feb. 27, 2017, which is expressly incorporated by reference herein.

BACKGROUND

The present disclosure relates to an actuator, and particularly to an actuator for use in an occupant support.

SUMMARY

According to the present disclosure, a vehicle seat includes a seat cushion and a backrest coupled to the seat cushion to pivot relative to the seat cushion. The vehicle seat further includes a hinge mechanism arranged to extend between and interconnect the backrest and the seat cushion to cause the backrest to move between various angular positions relative to the seat cushion. The vehicle seat further includes a guide mechanism arranged to extend between and interconnect the seat cushion and a floor of the vehicle to allow the seat cushion and backrest to translate back and forth relative to the floor.

In illustrative embodiments, the vehicle seat further includes a module including a first drive cable that is mounted so as to be movable between a first locking position configured to block movement of a first seat element with respect to a second seat element and a first unlocking position configured to allow the movement of the first seat element with respect to the second seat element, a second drive cable that is mounted so as to be movable between a second locking position configured to block movement of a third seat element with respect to a fourth seat element and a second unlocking position configured to allow movement of the third seat element with respect to the fourth seat element, and an actuating device comprising an actuator and a transmission assembly that is actuated by the actuator and acts selectively on the first drive cable or the second drive cable to move the drive cables between the locking and unlocking position.

In illustrative embodiments, the transmission assembly comprises a transmission member that is able to rotate about a central transmission axis in a first direction of rotation in order to drive the first drive cable from the first locking position to the first unlocking position and in a second direction of rotation, opposite to the first direction of rotation, in order to drive the second drive cable from the second locking position to the second unlocking position.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 2:
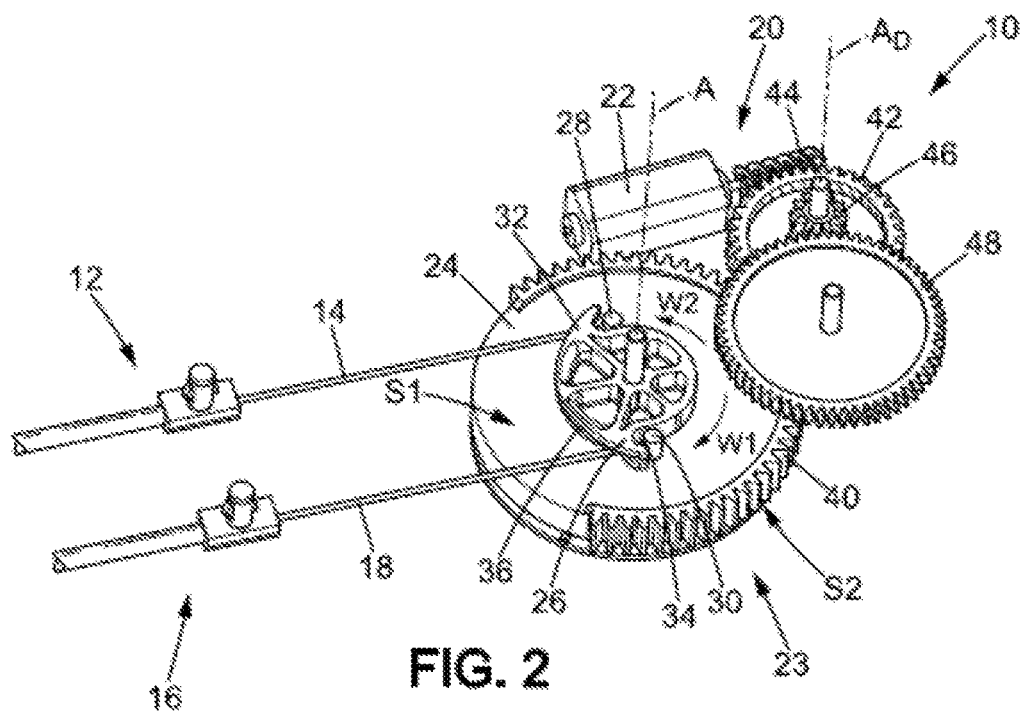
FIG. 2 is a partial perspective view taken from above showing the module of FIG. 1.

A portion of a module 10, for use in a vehicle, is shown in FIG. 2. The module 10, as shown in FIG. 2, comprises a first drive cable 14. The first drive cable 14 is mounted so as to be movable between a first locking position and a first unlocking position.

In the first locking position, the first drive cable 14 blocks a first seat element from moving with respect to a second seat element. For example, in the first locking position, the first drive cable 14 can allow the angular fixing of a seat backrest with respect to a seat cushion. However, in variant embodiments, the drive cable can, in the first locking position, allow the fixing of further seat elements, such as track elements or raising elements.

In the first unlocking position, the first drive cable 14 allows the first seat element to move with respect to the second seat element. For example, in the first locking position, the first drive cable 14 can allow a seat backrest to pivot with respect to a seat cushion or allow further seat elements to move.

The module 10 also includes a second drive cable 18 that is mounted so as to be movable between a second locking position and a second unlocking position. In the second locking position, the second drive cable 18 blocks a third seat element from moving with respect to a fourth seat element. The first, second, third, and fourth seat elements are different from one another a priori. For example, the second drive cable 18 is designed, in the second locking position, to fix a profiled element of a seat track with respect to another profiled element of the track. However, further seat elements may come into question in variant embodiments. In the second unlocking position, the second drive cable 18 allows the third seat element to move with respect to the fourth seat element.

As shown in FIGS. 2-6, the first and second drive cables 14, 18 are made to move into the locking and/or unlocking positions, and more specifically into the unlocking positions, by an actuating device 20. The actuating device 20 can be controlled by a seat user, for example by way of one or more control member(s) C1, C2 (shown in FIG. 1).

The actuating device 20 comprises an actuator 22 and a transmission assembly 23 comprising a transmission member 24. The transmission member 24 is able to rotate about a central transmission axis A in a first direction of rotation W1 and in a second direction of rotation W2, opposite to the first direction of rotation. The actuator 22 allows the transmission member 24 to be set into movement.

As shown, when the transmission member 24 moves in the first direction of rotation, it drives the first drive cable 14 from the first locking position to the first unlocking position. When the transmission member 24 moves in the second direction of rotation, it drives the second drive cable 18 from the second locking position to the second unlocking position.

The transmission member 24 can be a rocking component that is driven by the actuator into one position or into another (on one side or the other) depending on the drive cable 14, 18 that is desired to be moved. The transmission member 24 can have the overall shape of a disk (or wheel) with a first surface S1 and a second surface S2, on the opposite side from the first surface S1. For example, the transmission member 24 can have a rotationally symmetrical or substantially rotationally symmetrical shape. The central transmission axis A can be coincident with the axis of rotational symmetry of the transmission member 24.

In particular, the transmission member 24 has a retaining part 26. The retaining part can be provided on the first surface S1 of the transmission member 24. The retaining part 26 has the function of engaging with the first and second drive cables so as to transmit a movement to said first or second drive cable. The first drive cable engages with the transmission member by way of a push-only mechanical connection which transmits the movement of the transmission member 24 to the first drive cable 14 only in the direction of the push (i.e. only when the transmission member turns in the first direction of rotation). When the transmission member 24 turns in the second direction of rotation W2, the first drive cable 14 remains in the first locking position (no force is transmitted to this cable). For example, the first drive cable 14 is mounted so as to be movable in a sheath 12. The sheath 12 helps to keep the first drive cable 14 in position when the transmission member 24 turns in the second direction of rotation W2. The sheath 12 can be snap-fastened to a frame of a vehicle seat.

The second drive cable 18 engages with the transmission member 24 by way of a push-only mechanical connection which transmits the movement of the transmission member to the second drive cable only in the direction of the push (i.e. only when the transmission member turns in the second direction of rotation). When the transmission member 24 turns in the first direction of rotation W1, the second drive cable 18 remains in the second locking position (no force is transmitted to this cable). For example, the second drive cable 18 is mounted so as to be movable in a sheath 16. The sheath 16 helps to keep the first drive cable 18 in position when the transmission member 24 turns in the first direction of rotation W1. The sheath 16 can be snap-fastened to a frame of a vehicle seat.

In the present case, the first drive cable 14 comprises a first end 28. The second drive cable 18 comprises a first end 30. The first ends 28, 30 are notably free ends and are connected to the actuating device 20 by way of the transmission member 24 and more particularly by way of the retaining part 26.

As shown in the Figs., the retaining part 26 can have a first retaining portion 32 and a second retaining portion 34. The first retaining portion 32 can have a first hook with which the first end of the first drive cable 14 engages. The second retaining portion 34 can have a second hook with which the first end of the second drive cable 18 engages.

The first ends of the first and second drive cables can each have a retaining pin or an angled part which ensures that the cables are retained on the transmission member 44 or more particularly on the retaining part 26.

The first and second retaining portions 32, 34 are spaced apart from one another. The retaining part 26 has a wrapping zone 36. The wrapping zone 36 is situated between the first retaining portion 32 and the second retaining portion 34.

The wrapping zone 36 is designed so that the first drive cable 14 is wrapped around the wrapping zone 36 when the transmission member 24 turns in the first direction of rotation. The wrapping around the wrapping zone 36 causes a pulling force on an element connected to the first drive cable 14 and notably on an element connected to a second end of the first drive cable. For example, if the second end of the first drive cable 14 is connected to a hinge mechanism of a vehicle seat backrest, the second end can exert a pull on a releasing pin or any similar element in order to release the angular position of a seat backrest with respect to a seat cushion.

The wrapping zone 36 is designed so that the second drive cable 18 is wrapped around the wrapping zone 36 when the transmission member 24 turns in the second direction of rotation. The wrapping around the wrapping zone 36 causes a pulling force on an element connected to the second drive cable 18 and notably on an element connected to a second end of the second drive cable 18. For example, if the second end of the second drive cable 18 is connected to a guide device of tracks of a vehicle seat, the second end of the second drive cable 18 can exert a pull on a releasing pin or any similar element in order to release the position of one profiled element of a track with respect to another.

The wrapping zone 36 can have a groove designed to receive the first or the second drive cable 14, 18 during the wrapping thereof. This groove allows the cables to be guided. For example, the wrapping zone has a curved surface and/or a domed shape.

Elastic springback is provided to return the first drive cable or the second drive cable into the locking position. In the present case, the first locking position and the second locking position are stable positions of the first and second drive cables 14, 18.

Figure 4:
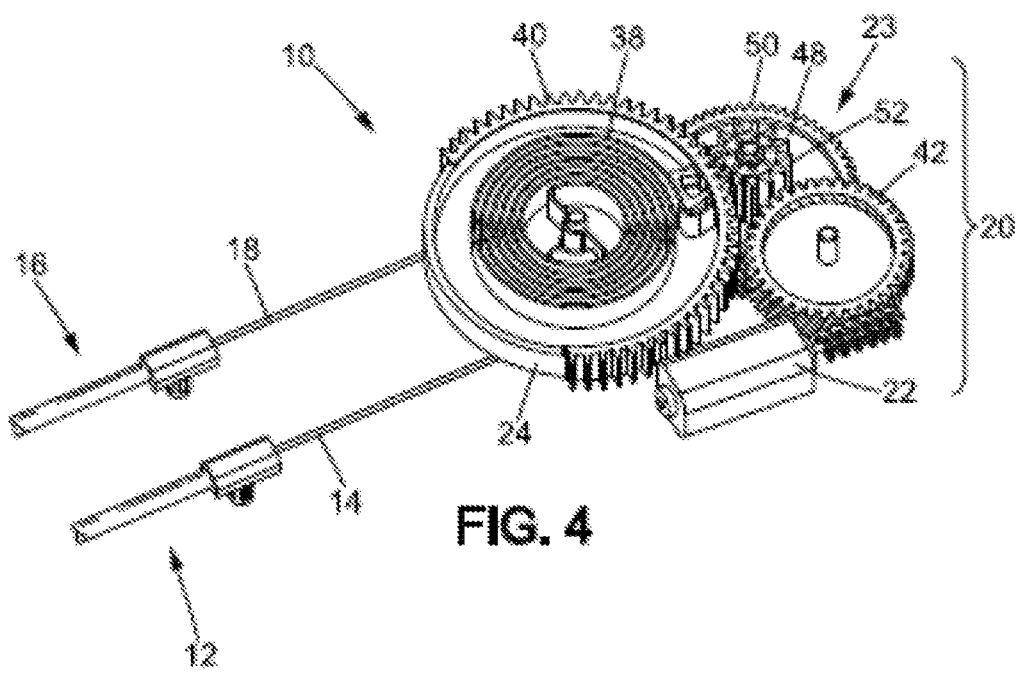
FIG. 4 is a partial perspective view taken from below of the module of FIG. 2.

The elastic springback is realized for the two drive cables 14, 18 by a single elastic springback device 38. The elastic springback device 38 can be or can comprise a spring. Preferably, the spring is a spiral spring. For example, as shown in FIG. 4, the elastic springback is realized by a spiral spring 38. However, in variant embodiments, other elastic springback devices can be provided, for example a helical spring, a tension spring, etc.

The elastic springback device can be provided on the second surface S2 of the transmission member. For example, the transmission member has a circular shape and defines, on the second surface S2, a cavity in which the elastic springback device can be disposed. Thus, the elastic springback device 38 does not protrude from the transmission member 24.

For example, if the elastic springback device is or comprises a spiral spring, in order that this spring ensures both the elastic springback when the transmission member 24 has turned in the first direction of rotation W1 in order to move the first drive cable 14 toward its first unlocking position and the elastic springback when the transmission member 24 has turned in the second direction of rotation W2 in order to move the second drive cable 18 toward its second unlocking position, the spiral spring is activated in both directions of rotation. In the present case, the spiral spring is held both at its center C and at its end E.

In the present case, a peg is provided on the transmission member 24 in order to engage with the spiral spring at its end E by way of a push-only mechanical connection so as to activate the spiral spring in one direction when the transmission member 24 turns in a first direction while having no interaction with the spiral spring when the transmission member 24 turns in a second direction, opposite to the first. At the center C of the spiral spring, a similar configuration can be adopted.

The transmission member 24 is set into movement, as indicated above, by the actuator 22. The transmission of movement from the actuator to the transmission member can be realized directly. For example, the actuator 22 engages with the transmission member 24. In variant embodiments, the transmission of movement from the actuator to the transmission member can be realized by different intermediate elements. More particularly, the transmission assembly can have, besides the transmission member 24, an actuating gear wheel 42.

The actuating gear wheel 42 engages with the actuator 22 by way of an actuating stem 44. The actuating stem is driven in rotation directly by the actuator 22. More specifically, the actuating stem 44 can be provided directly at the output of the actuator 22. The actuating stem 44 and the actuating gear wheel 42 can form a worm and wheel system. The actuating gear wheel 42 turns in one direction and the other about an actuating axis $A_D$. An actuating pinion 46 can be provided fastened to the actuating gear wheel 42. The axis of the actuating pinion 46 can be coincident with that of the actuating gear wheel 42. The teeth of the actuating pinion 46 can be straight teeth or helical teeth for limiting noise.

The actuating pinion 46 can engage with at least one intermediate member 48 disposed between the actuating pinion 46 and the transmission member 24. As shown in FIGS. 2, 4, 5 and 6, the actuating pinion 46 engages with an intermediate member 48 disposed between the actuating pinion 46 and the transmission member 24. However, in variant embodiments, several intermediate members can be provided. The intermediate member 48 can have an intermediate gear wheel 50 which engages with the actuating pinion 46. The intermediate member 48 can have an intermediate pinion 52 (visible in FIG. 4) which engages with the transmission member 24. The axes of the intermediate pinion 52 and of the intermediate gearwheel 50 can be coincident.

In particular, as shown in FIGS. 2-6, the transmission member 24 can have a toothed portion 40. If the transmission member 24 has a circular overall shape, for example a disk shape, the toothed portion 40 can be provided on the edge of the disk. The toothed portion 40 can comprise for example straight teeth or helical teeth. The toothed portion 40 can extend around the entire periphery of the transmission member (over the entire edge of the transmission member), or over a particular angular portion. The toothed portion 40 engages, as can be seen in FIGS. 2, 4, 5 and 6, with the intermediate pinion 52.

Figure 3:
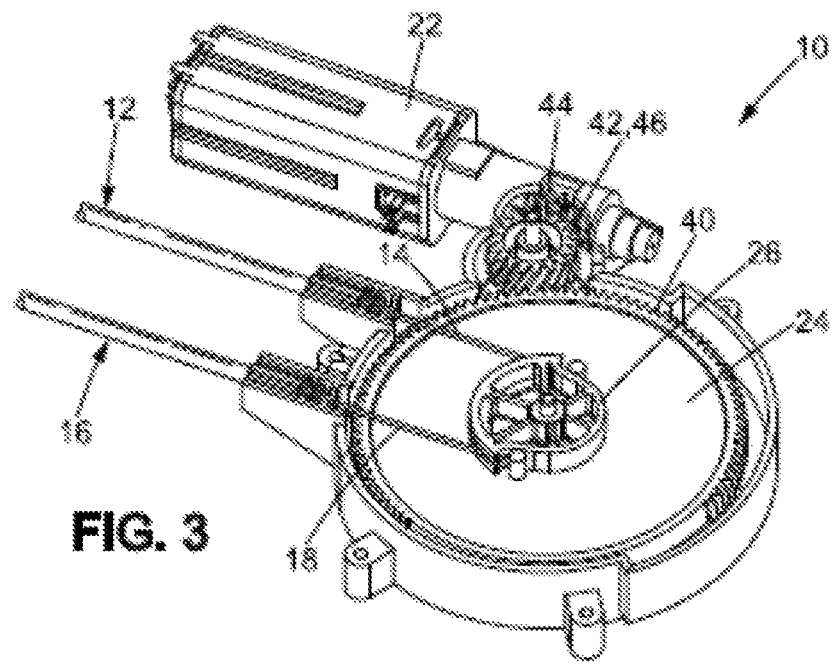
FIG. 3 is a partial perspective view taken from above of a another embodiment of a module in accordance with the present disclosure.

In a variant embodiment shown in FIG. 3, the actuating pinion 46 engages directly with the toothed portion 40 of the transmission member (there is no intermediate member). The actuating pinion 46 can engage directly with the actuating stem 44 (there is no actuating gear wheel). The presence or absence of the intermediate member 48 depends on the power and the type of actuator.

The actuator is for example an electric and/or hydraulic and/or pneumatic and/or mechanical actuator. The actuator can also be an electric motor and/or a piezoelectric motor and/or comprise a shape-memory alloy. If the actuator is an electric actuator, it can cooperate with a reversible geared motor.

Figure 1:
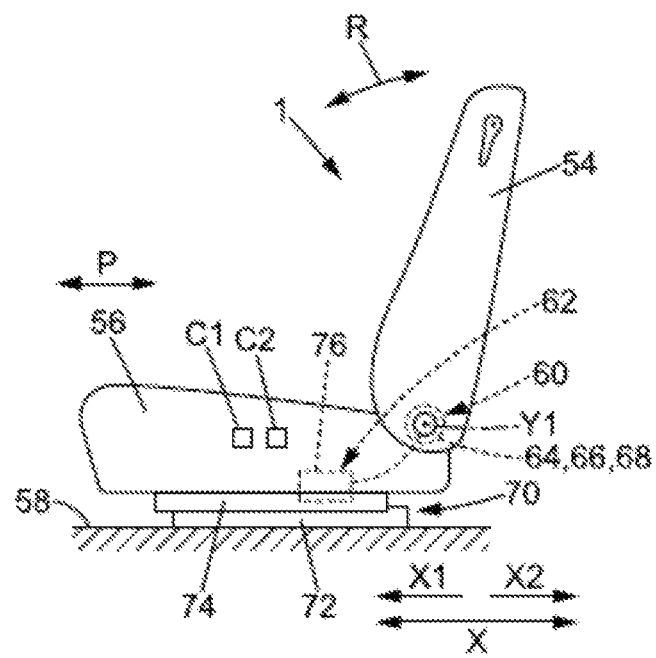
FIG. 1 is a diagrammatic view of a vehicle seat to which a module for a vehicle seat according to the present disclosure is attached.
Figure 5:
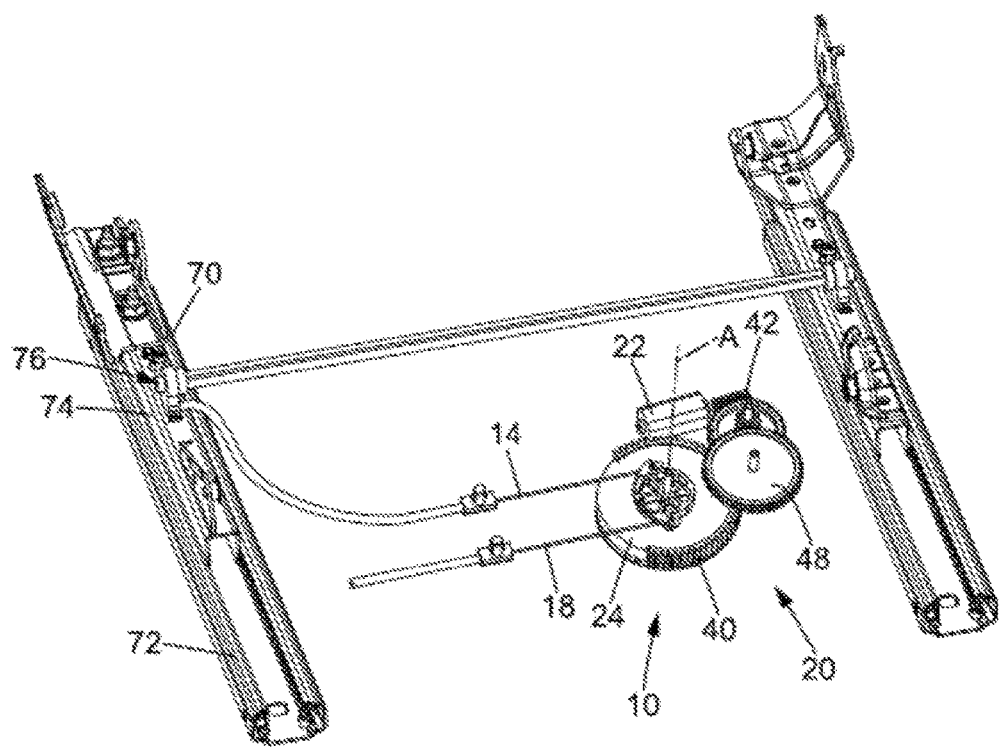
FIG. 5 is a partial perspective view of the module of FIG. 2 coupled to tracks included in the vehicle seat.
Figure 6:
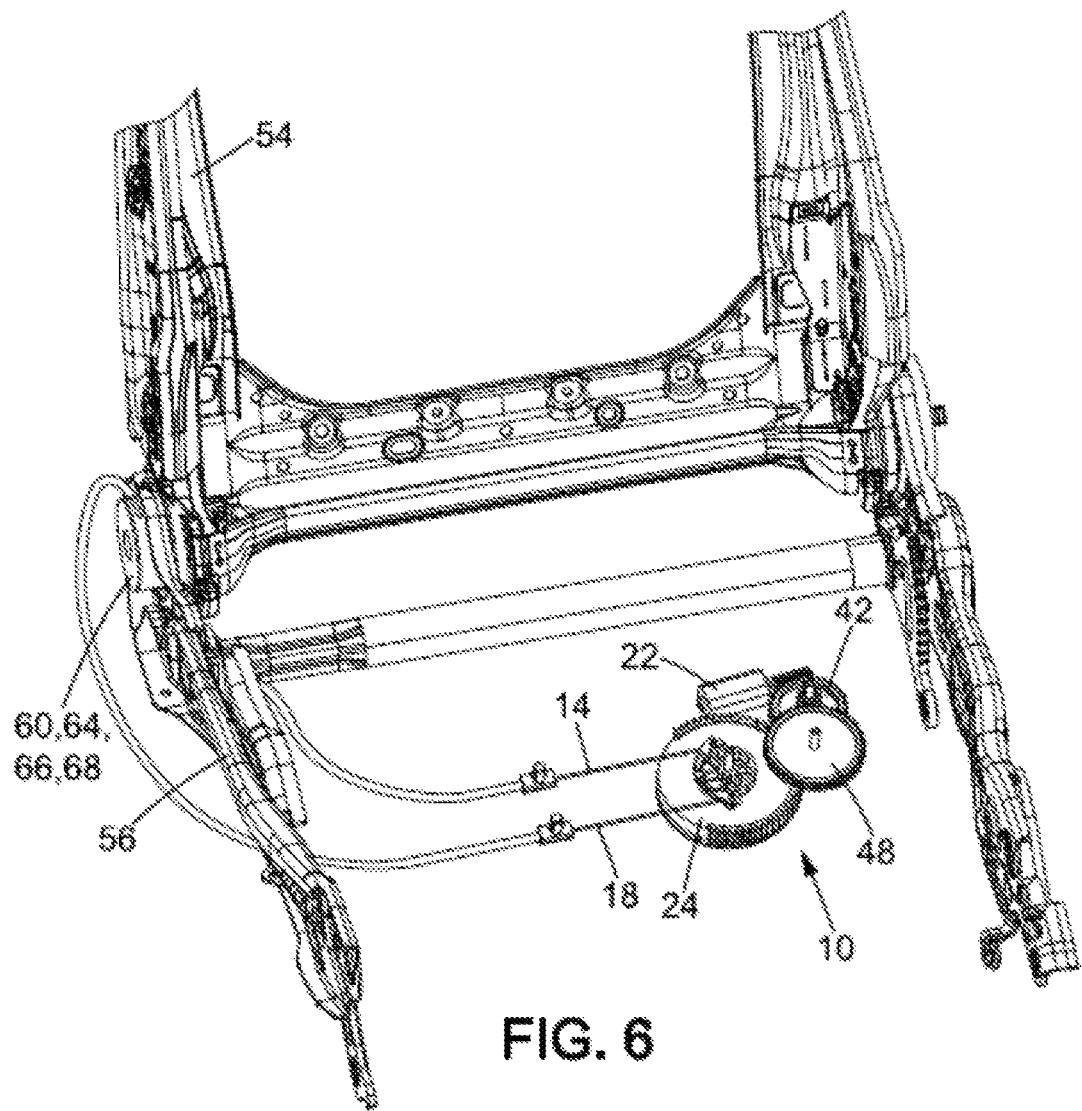
FIG. 6 is a perspective view of the module from FIG. 2 coupled to both a seat cushion structure and to a backrest structure of a vehicle seat.

The module 10 can be fitted on a vehicle seat 1, as can be seen in FIGS. 1, 5, and 6. FIGS. 1, 5, and 6 show an example of the fitting of the module 10 on a vehicle seat. However, other ways of fitting the module 10 on a vehicle seat can be provided.

FIG. 1 shows the seat 1 comprising a backrest 54 mounted so as to pivot about at least one pivot axis Y1 on a seat cushion 56. The seat cushion 56 is itself mounted so as to be movable in translation on a fixed structure 58, notably a floor pan of the vehicle.

The seat 1 can be configured such that it is possible to adjust an inclination R of the backrest 54 with respect to the seat cushion 56 and a position P of the seat 1 with respect to the fixed structure 58.

In this particular case, the seat 1, as shown notably in FIG. 1, can comprise a hinge mechanism 60 designed to adjust the inclination R of the backrest 54, a guide mechanism 62 designed to adjust the position P of the seat 1 with respect to the fixed structure 58, and the module 10.

The hinge mechanism 60 can have a first strength member 64. The first strength member 64 is secured to a structural element of the seat cushion 56. For example, the first strength member 64 can be formed by a metal plate in the form of a disk having the pivot axis Y1 as its normal.

The hinge mechanism 60 can have a second strength member 66. For example, the second strength member 66 is secured to a structural element of the backrest 54. The second strength member 66 can be formed for example by a metal plate in the form of a disk having the pivot axis Y1 as its normal.

The first strength member 64 and the second strength member 66 are mounted so as to rotate with respect to one another about the pivot axis Y1. For example, the first strength member 64 and the second strength member 66 can be connected together by a rotation device (not shown) that ensures easy rotation between the first strength member 64 and the second strength member 66. This rotation device is conventional and will not be described in more detail.

The hinge mechanism 60 also comprises a fixing device 68 that is able to maintain or define an angular position of the second strength member 66 with respect to the first strength member 64. Thus, a user of the seat 1, having chosen the angular position of the backrest 54 with respect to the seat cushion 56 which suits him, may fix this angular position and make it stable. More specifically, the fixing device 68 is movable between a fixing position and a releasing position. In the fixing position, the fixing device 68 fixes the angular position of the second strength member 66 with respect to the first strength member 64. Thus, in the fixing position of the fixing device 68, the second strength member 66 cannot move about the pivot axis Y1 with respect to the first strength member 64. In other words, the backrest 54 cannot move with respect to the seat cushion 56. For example, the fixing device 68 acts on the rotation device (not shown) by way of a bolt or any other type of structure that blocks rotation. This bolt or these structures for blocking rotation are conventional and will not be described in more detail. In the releasing position, the fixing device 68 allows the second strength member 66 to move about the pivot axis Y1 with respect to the first strength member 64. The fixing device 68 can be elastically urged toward the fixing position. Thus, the fixing position is what is known as a stable position.

As can be seen in FIG. 6, the second drive cable 18 can make the fixing device move from the fixing position to the releasing position. In particular, when the second drive cable 18 is movable from the second locking position to the second unlocking position, it can act on the fixing device so as to drive it from the fixing position to the releasing position.

The seat 1 can also comprise, as mentioned above, a guide mechanism 62. The guide mechanism 62 has a first track 70. The track 70 makes it possible to adjust, for example, the position P of the seat 1 with respect to the fixed structure 58, notably the floor pan of the vehicle, by sliding in a longitudinal direction X of the track, in particular in a first direction X1 (in this case toward the rear) and in a second direction X2, opposite to the first direction X1 (in this case toward the front).

The track 70 comprises a first profiled element 72 and a second profiled element 74. The first profiled element 72 and the second profiled element 74 extend in the longitudinal direction X. The first profiled element 72 and the second profiled element 74 are mounted so as to slide with respect to one another in the longitudinal direction X, in a first direction X1 and a second direction X2. For example, the second profiled element 74 is joined securely to a structural element of the seat cushion 56. Similarly, the first profiled element 72 is, for example, secured to the fixed structure 58, notably secured to the floor pan of the vehicle.

In order to block the second profiled element 74 of the track 70 from sliding with respect to the first profiled element 72 of the track 70, the guide mechanism 62 also has a locking device 76. The locking device 76 is mounted so as to be movable between a locking position and an unlocking position. In the locking position, the locking device 76 locks the position of the second profiled element 34 of the track 70 with respect to the first profiled element 72 of the track 70, thereby blocking any relative movement of the second profiled element 74 with respect to the first profiled element 72 along the longitudinal axis X. In the unlocking position, the locking device 76 allows the second profiled element 74 to move with respect to the first profiled element 72.

The locking device 76 can be elastically urged toward the locking position. Thus, the locking position is what is known as a stable position.

As can be seen in FIG. 5, the first drive cable 14 can make the locking device 76 move from the locking position to the unlocking position. In particular, when the first drive cable 14 is movable from the first locking position to the first unlocking position, it can act on the locking device 76 so as to drive it from the locking position to the unlocking position.

In this particular case, in the example described with reference to FIGS. 1, 5, and 6, in the first unlocking position of the first drive cable 14, the second strength member 66 is movable with respect to the first strength member 64. In the first locking position of the first drive cable 14, the angular position of the second strength member 66 with respect to the first strength member 68 is fixed. In the second unlocking position of the second drive cable 18, the second profiled element moves with respect to the first profiled element. In the second locking position of the second drive cable 18, the position of the second profiled element with respect to the first profiled element is locked.

However, the first and second drive cables 14, 18 can control other mechanisms of the seat 1. More generally, the first drive cable 14 is intended to control a first mechanism, for example a seat backrest hinge mechanism, a seat guide mechanism, or a seat raising mechanism, and the second drive cable 18 is intended to control a second mechanism, for example a seat backrest hinge mechanism, a seat guide mechanism, or a seat raising mechanism. The module 10 is particularly compact and can be fixed to a frame of the seat 1 for example by snap-fastening, the first and second actuating cables 14, 18 then being able to be connected to different mechanisms to be controlled. It is also possible to join the actuating device 20 to a frame of the seat 1 by snap-fastening. After the actuating device has been fastened, it is then possible to put the drive cables 14, 18 in position. Fastening is thus carried out easily. The module 10 can also have a housing which could notably make it possible to keep the cables and the different elements making up the module 10 in position.

In the present case, locking device should be interpreted broadly in order to describe a device that is designed to carry out an action intended to make a first element immovable or movable with respect to a second element, regardless of the relative initial position of the first and second elements.

A module in accordance with the present disclosure reduces complexity of assemblies comprising means for controlling locking devices for vehicle seats with a system for providing the control of the locking devices. The module in accordance with the present disclosure minimizes the bulk of other assemblies by providing a module and an actuating device that are easy to manipulate and take up little space.

A module for a vehicle seat comprises a first drive cable, a second drive cable, and an actuating device. The first drive cable is mounted so as to be movable, with a first locking position designed to block the movement of a first seat element with respect to a second seat element, and a first unlocking position designed to allow the movement of the first seat element with respect to the second seat element. The second drive cable that is mounted so as to be movable, with a second locking position designed to block the movement of a third seat element with respect to a fourth seat element, and a second unlocking position designed to allow the movement of the third seat element with respect to the fourth seat element.

The actuating device comprises an actuator and a transmission assembly that is actuated by the actuator and acts selectively on the first drive cable or the second drive cable, the transmission assembly comprising a transmission member that is able to rotate about a central transmission axis in a first direction of rotation in order to drive the first drive cable from the first locking position to the first unlocking position, and in a second direction of rotation, opposite to the first direction of rotation, in order to drive the second drive cable from the second locking position to the second unlocking position.

By virtue of these arrangements, and notably by virtue of the presence of two drive cables, each controlling a different function, but both being actuated by the same actuating device and notably by the same actuator, a module that is particularly simple to employ is produced. The module is robust and has a reduced bulk and weight, thereby allowing easy fitting when it is mounted on the vehicle seat.

According to one embodiment, the transmission assembly also comprises an elastic springback device that elastically urges the first drive cable toward the first locking position and the second drive cable toward the second locking position. The elastic springback device is a single elastic springback device and ensures both the elastic springback of the first drive cable to the first locking position and that of the second drive cable to the second locking position. The presence of one elastic springback device for the two drive cables notably makes it possible to reduce the number of parts and to minimize the complexity of the locking mechanisms controlled by the module. The presence of one elastic springback device for the two drive cables also allows a saving of weight for the assembly and a reduction in bulk. Moreover, this arrangement provides a precise stable position, which is the one in which the two cables are in the locking position. Finally, the presence of one elastic springback device allows the module to be made more compact and thus makes it easier to arrange and fit on the seat.

In one example, the elastic springback device comprises a spring. In another example, the elastic springback device is a spring. In one embodiment, the spring is a spiral spring. The spiral spring allows the elastic springback of the two drive cables. Moreover, the spiral spring provides minimized bulk. The spiral spring generates a return force for the elastic springback, which is compatible with the forces to be exerted on the drive cables and on the mechanisms that they control. The spiral spring can be deformed with forces that are compatible with the actuator of the actuating device.

In one illustrative embodiment, the spiral spring elastically urges the first drive cable toward the first locking position and the second drive cable toward the second locking position.

In one illustrative embodiment, the actuator is an electric and/or hydraulic and/or pneumatic and/or mechanical actuator and/or an electric motor and/or a piezoelectric motor and/or comprises a shape-memory alloy.

In one illustrative embodiment, the actuator is an electric actuator that cooperates with a reversible geared motor.

In one illustrative embodiment, the actuating device comprises an actuating stem that is driven in rotation by the actuator. The stem can be actuated in a first direction and in a second direction, opposite to the first direction.

In one illustrative embodiment, the transmission assembly comprises an actuating gear wheel with which the actuating stem engages.

In one illustrative embodiment, the transmission assembly comprises an actuating pinion fastened to the actuating gear wheel. The actuating pinion and the actuating gear wheel form for example a one-piece component. The actuating pinion has for example a central pinion axis which is coincident with the central axis of the actuating gear wheel.

In one illustrative embodiment, the transmission member has a toothed portion. For example, the transmission member has a disk (or wheel) shape and the toothed portion is arranged on the edge of the disk (of the wheel).

In one illustrative embodiment, the actuating pinion and the toothed portion engage so as to transmit a movement from the actuator to the transmission member and to drive the transmission member in the first direction of rotation or in the second direction of rotation.

In one illustrative embodiment, the transmission assembly comprises an intermediate member that is disposed between the actuating pinion and the toothed portion and engages with the actuating pinion and the toothed portion so as to transmit a movement from the actuator to the transmission member and to drive the transmission member in the first direction of rotation or in the second direction of rotation.

In one illustrative embodiment, the intermediate member has an intermediate gear wheel which engages with the actuating pinion, and an intermediate pinion which engages with the toothed portion.

In one illustrative embodiment, the first drive cable and the second drive cable each have a first end. The first end is for example a free end.

In one illustrative embodiment, the transmission member has a retaining part for retaining the first ends of the first and second drive cables.

In one illustrative embodiment, the retaining part has a first retaining portion for retaining the first end of the first drive cable and a second retaining portion for retaining the first end of the second drive cable.

In one illustrative embodiment, the first and second retaining portions are spaced apart from one another.

In one illustrative embodiment, the first end of the first drive cable engages with the first retaining portion by way of a push-only mechanical connection which transmits the movement of the transmission member to the first drive cable only in the direction of the push when the transmission member turns in the first direction of rotation. In other words, when the transmission member turns in the first direction of rotation, a force is applied to the first end of the first drive cable. When the transmission member turns in the second direction of rotation, no force is applied to the first end of the first drive cable and the latter remains held in position, for example by a sheath, itself intended to be fastened to the seat.

In one illustrative embodiment, the first end of the second drive cable engages with the second retaining portion by way of a push-only mechanical connection which transmits the movement of the transmission member to the second drive cable only in the direction of the push when the transmission member turns in the second direction of rotation. In other words, when the transmission member turns in the second direction of rotation, a force is applied to the first end of the second drive cable. When the transmission member turns in the first direction of rotation, no force is applied to the first end of the second drive cable and the latter remains held in position, for example by a sheath, itself intended to be fastened to the seat.

In one illustrative embodiment, the first retaining portion comprises a first hook and the second retaining portion comprises a second hook. According to one embodiment, the first end of the first cable engages with the first hook. According to one embodiment, the first end of the second drive cable engages with the second hook.

In one illustrative embodiment, the first end of the first drive cable has a first retaining pin. According to one embodiment, the second end of the second drive cable has a second retaining pin. In one illustrative embodiment, the first retaining pin engages with the first hook. In one illustrative embodiment, the second retaining pin engages with the second hook.

In one illustrative embodiment, the retaining part has a wrapping zone, the first and the second hook being situated on either side of the wrapping zone, wherein the rotation of the transmission member in the first direction causes the first drive cable to be wrapped around the wrapping zone and the first drive cable to be moved from the locking position to the unlocking position.

In one illustrative embodiment, the wrapping zone may have a groove for guiding the cable.

In one illustrative embodiment, the rotation of the transmission member in the second direction causes the second drive cable to be wrapped around the wrapping zone and the second drive cable to be moved from the locking position to the unlocking position.

In one illustrative embodiment, the transmission member comprises a first surface and a second surface, on the opposite side from the first surface, the retaining part is provided on the first surface, and the return spring is provided on the second surface. This arrangement ensures robust operation of the device without any risk of interference between the various elements and members.

A vehicle seat comprises a seat cushion, a backrest, a hinge mechanism, a guide mechanism, and a module. The backrest is mounted in a pivotable manner on the seat cushion. The hinge mechanism is designed to adjust the angular position of the backrest with respect to the seat cushion and has a first strength member intended to be fastened to the seat cushion and a second strength member intended to be fastened to the backrest. A guide mechanism having a track comprising a first profiled element and a second profiled element that extends in a longitudinal direction and are mounted so as to slide in the longitudinal direction with respect to one another.

The first drive cable engages with a device for fixing the angular position of the second strength member with respect to the first strength member. The angular position of the second strength member with respect to the first strength member being fixed when the first drive cable is in the first locking position and the second strength member being able to move with respect to the first strength member when the first drive cable is in the first unlocking position.

The second drive cable engages with a locking device of the track, the position of the second profiled element with respect to the first profiled element being locked when the second drive cable is in the second locking position and the second profiled element can move with respect to the first profiled element when the second drive cable is in the second unlocking position.

A seat is configured such that, in the first unlocking position of the first drive cable, the second strength member is movable with respect to the first strength member. In the first locking position of the first drive cable, the angular position of the second strength member with respect to the first strength member is fixed. In the second unlocking position of the second drive cable, the second profiled element moves with respect to the first profiled element. In the second locking position of the second drive cable, the position of the second profiled element with respect to the first profiled element is locked. Such a seat is easy to control with a compact module that is easy to fit.

In one illustrative embodiment, the module or the actuating device is fastened to the frame of the seat by snap-fastening. Such fastening allows the module or the actuating device to be fitted rapidly on the seat.

In one illustrative embodiment, an actuating device for a vehicle seat is coupled to a first drive cable and a second drive cable. The actuating device comprises an actuator and a transmission assembly. The transmission assembly is actuated by the actuator and is designed to act selectively on the first drive cable or the second drive cable.

The transmission assembly comprises a transmission member that is able to rotate about a central transmission axis in a first direction of rotation in which it is designed to drive the first drive cable, and in a second direction of rotation, opposite to the first direction of rotation, in which it is designed to drive the second drive cable.

The actuating device is connected to a first drive cable and a second drive cable so as to form a module for a vehicle as described above.

In one illustrative embodiment, the actuating device may be made of one and/or another of the following arrangements: the transmission assembly comprises an elastic springback device designed to elastically urge the first drive cable toward the first locking position and the second drive cable toward the second locking position; the elastic springback device comprises a spring; the elastic springback device comprises a spiral spring; the transmission member is a rocking component that is driven by the actuator in the first direction of rotation and in the second direction of rotation; the actuating device comprises an actuating stem that is driven in rotation by the actuator; the transmission assembly comprises an actuating gear wheel with which the actuating stem engages; the transmission assembly comprises an actuating pinion fastened to the actuating gear wheel; which the transmission member has a toothed portion; the actuating pinion and the toothed portion engage so as to transmit a movement from the actuator to the transmission member and to drive the transmission member in the first direction of rotation or in the second direction of rotation; the transmission assembly comprises an intermediate member that is disposed between the actuating pinion and the toothed portion and engages with the actuating pinion and the toothed portion so as to transmit a movement from the actuator to the transmission member and to drive the transmission member in the first direction of rotation or in the second direction of rotation; the transmission member has a retaining part designed to retain ends of the drive cables; the retaining part has a first and a second retaining portion; the first and second retaining portions are spaced apart from one another; the retaining part has a wrapping zone; the first retaining portion and the second retaining portion are situated on either side of the wrapping zone; and the wrapping zone has a groove designed to receive a drive cable.

More particularly, the present disclosure relates to a module for a vehicle seat that is designed to control two locking devices that are able to block and/or allow the movement of one vehicle seat element with respect to another vehicle seat element and also comprises an actuating device for actuating the devices. The present disclosure also relates to an actuating device for a vehicle seat. The present disclosure furthermore relates to a vehicle seat comprising a module for a vehicle seat that is configured to control two locking devices that allow or block the movement of one vehicle seat element with respect to another vehicle seat element. The module may be configured to allow or block the movement of a seat backrest with respect to a seat cushion and/or the movement of a seat cushion with respect to a vehicle chassis that holds the seat in a longitudinal or transverse or any other direction.

The invention claimed is:

1. A module for a vehicle seat, the module comprising:
a first drive cable that is mounted so as to be movable between a first locking position configured to block movement of a first seat element with respect to a second seat element and a first unlocking position configured to allow the movement of the first seat element with respect to the second seat element,
a second drive cable that is mounted so as to be movable between a second locking position configured to block movement of a third seat element with respect to a fourth seat element and a second unlocking position configured to allow movement of the third seat element with respect to the fourth seat element, and
an actuating device comprising an actuator and a transmission assembly that is actuated by the actuator and acts selectively on the first drive cable or the second drive cable,
wherein the transmission assembly comprises a transmission member that is able to rotate about a central transmission axis in a first direction of rotation in order to drive the first drive cable from the first locking position to the first unlocking position and in a second direction of rotation, opposite to the first direction of rotation, in order to drive the second drive cable from the second locking position to the second unlocking position.

2. The module of claim 1, wherein the transmission assembly also comprises an elastic springback device that urges elastically the first drive cable toward the first locking position and the second drive cable toward the second locking position.

3. The module of claim 2, wherein the elastic springback device comprises a spiral spring and the spiral spring urges elastically the first drive cable toward the first locking position and the second drive cable toward the second locking position.

4. The module of claim 3, wherein the transmission member is a rocking component that is driven by the actuator in the first direction of rotation in order to drive the first drive cable from the first locking position to the first unlocking position and in the second direction of rotation in order to drive the second drive cable from the second locking position to the second unlocking position.

5. The module of claim 1, wherein the transmission member is a rocking component that is driven by the actuator in the first direction of rotation in order to drive the first drive cable from the first locking position to the first unlocking position and in the second direction of rotation in order to drive the second drive cable from the second locking position to the second unlocking position.

6. The module of claim 5, wherein the actuating device comprises an actuating stem that is driven in rotation by the actuator and the transmission assembly further comprises an actuating gear wheel with which the actuating stem engages.

7. The module of claim 6, wherein the transmission assembly further comprises an actuating pinion fastened to the actuating gear wheel, the transmission member includes a toothed portion, and the actuating pinion and the toothed portion engage so as to transmit a movement from the actuator to the transmission member and to drive the transmission member in the first direction of rotation or in the second direction of rotation.

8. The module of claim 1, wherein the actuating device comprises an actuating stem that is driven in rotation by the actuator and the transmission assembly further comprises an actuating gear wheel with which the actuating stem engages.

9. The module of claim 8, wherein the transmission assembly further comprises an actuating pinion fastened to the actuating gear wheel, the transmission member includes a toothed portion, and the actuating pinion and the toothed portion engage so as to transmit a movement from the actuator to the transmission member and to drive the transmission member in the first direction of rotation or in the second direction of rotation.

10. The module of claim 8, wherein the transmission assembly comprises an actuating pinion fastened to the actuating gear wheel, the transmission member includes a toothed portion, the transmission assembly comprises an intermediate member that is disposed between the actuating pinion and the toothed portion and engages with the actuating pinion and the toothed portion so as to transmit a movement from the actuator to the transmission member and to drive the transmission member in the first direction of rotation or in the second direction of rotation.

11. The module of claim 10, wherein the first drive cable and the second drive cable each have a first end, the transmission member has a retaining part for retaining the first ends of the first and second drive cables, wherein the retaining part has a first retaining portion for retaining the first end of the first drive cable and a second retaining portion for retaining the first end of the second drive cable, and the first and second retaining portions are spaced apart from one another.

12. The module of claim 11, wherein the first end of the first drive cable engages with the first retaining portion by way of a push-only mechanical connection which transmits the movement of the transmission member to the first drive cable only in the direction of the push when the transmission member turns in the first direction of rotation and the first end of the second drive cable engages with the second retaining portion by way of a push-only mechanical connection which transmits the movement of the transmission member to the second drive cable only in the direction of the push when the transmission member turns in the second direction of rotation.

13. The module of claim 12, wherein the retaining part has a wrapping zone, the first retaining portion and the second retaining portion being situated on either side of the wrapping zone, wherein the rotation of the transmission member in the first direction of rotation causes the first drive cable to be wrapped around the wrapping zone and the first drive cable to be moved from the locking position to the unlocking position, and the rotation of the transmission member in the second direction of rotation causes the second drive cable to be wrapped around the wrapping zone and the second drive cable to be moved from the locking position to the unlocking position.

14. The module of claim 11, wherein the retaining part has a wrapping zone, the first retaining portion and the second retaining portion being situated on either side of the wrapping zone, wherein the rotation of the transmission member in the first direction of rotation causes the first drive cable to be wrapped around the wrapping zone and the first drive cable to be moved from the locking position to the unlocking position, and the rotation of the transmission member in the second direction of rotation causes the second drive cable to be wrapped around the wrapping zone and the second drive cable to be moved from the locking position to the unlocking position.

15. The module of claim 1, wherein the first drive cable and the second drive cable each have a first end, the transmission member has a retaining part for retaining the first ends of the first and second drive cables, wherein the retaining part has a first retaining portion for retaining the first end of the first drive cable and a second retaining portion for retaining the first end of the second drive cable, and the first and second retaining portions are spaced apart from one another.

16. The module of claim 15, wherein the first end of the first drive cable engages with the first retaining portion by way of a push-only mechanical connection which transmits the movement of the transmission member to the first drive cable only in the direction of the push when the transmission member turns in the first direction of rotation and the first end of the second drive cable engages with the second retaining portion by way of a push-only mechanical connection which transmits the movement of the transmission member to the second drive cable only in the direction of the push when the transmission member turns in the second direction of rotation.

17. A vehicle seat comprising:
a seat cushion, a backrest mounted in a pivotable manner on the seat cushion, a hinge mechanism that is configured to adjust the angular position of the backrest with respect to the seat cushion and has a first strength member intended to be fastened to the seat cushion and a second strength member intended to be fastened to the backrest, a guide mechanism including a track comprising a first profiled element and a second profiled element that extend in a longitudinal direction and are mounted so as to slide in the longitudinal direction with respect to one another, a module including a first drive cable that is mounted so as to be movable between a first locking position configured to block movement of a first seat element with respect to a second seat element and a first unlocking position configured to allow the movement of the first seat element with respect to the second seat element, a second drive cable that is mounted so as to be movable between a second locking position configured to block movement of a third seat element with respect to a fourth seat element and a second unlocking position configured to allow movement of the third seat element with respect to the fourth seat element, and an actuating device comprising an actuator and a transmission assembly that is actuated by the actuator and acts selectively on the first drive cable or the second drive cable, wherein the transmission assembly comprises a transmission member that is able to rotate about a central transmission axis in a first direction of rotation in order to drive the first drive cable from the first locking position to the first unlocking position and in a second direction of rotation, opposite to the first direction of rotation, in order to drive the second drive cable from the second locking position to the second unlocking position.

18. The vehicle seat of claim 17, wherein the first drive cable engages with a device for fixing the angular position of the second strength member with respect to the first strength member, the angular position of the second strength member with respect to the first strength member is fixed when the first drive cable is in the first locking position and the second strength member is able to move with respect to the first strength member when the first drive cable is in the first unlocking position and the second drive cable engages with a locking device of the track, the position of the second profiled element with respect to the first profiled element being locked when the second drive cable is in the second locking position and the second profiled element can move with respect to the first profiled element when the second drive cable is in the second unlocking position.

19. The vehicle seat of claim 18, further comprising a frame and the actuating device of the module is coupled to the frame of the vehicle seat by snap-fastening.

20. An actuating device for a vehicle seat, the actuating device comprising:
an actuator and
a transmission assembly that is actuated by the actuator and is configured to act selectively on a first drive cable or a second drive cable,
wherein the transmission assembly comprises a transmission member that is able to rotate about a central transmission axis in a first direction of rotation in which it is configured to drive the first drive cable and in a second direction of rotation, opposite to the first direction of rotation, in which it is configured to drive the second drive cable.

* * * * *